United States Patent
Chhuor (10) Patent No.: US 9,766,807 B2
(45) Date of Patent: Sep. 19, 2017

(54) METHOD AND SYSTEM FOR GIVING PROMPT ABOUT TOUCH INPUT OPERATION

(71) Applicant: Lenovo Enterprise Solutions (Singapore) Pte. Ltd., New Tech Park (SG)

(72) Inventor: CheKim Chhuor, Shanghai (CN)

(73) Assignee: Lenovo Enterprise Solutions (Singapore) Pte. Ltd., New Tech Park (SG)

(*) Notice: Subject to any disclaimer, the term of this patent is extended or adjusted under 35 U.S.C. 154(b) by 171 days.

(21) Appl. No.: 14/685,632

(22) Filed: Apr. 14, 2015

(65) Prior Publication Data

US 2016/0034184 A1  Feb. 4, 2016

(30) Foreign Application Priority Data

Jul. 30, 2014 (CN) .......................... 2014 1 0367831

(51) Int. Cl.
*G06F 3/0481* (2013.01)
*G06F 3/0489* (2013.01)
(Continued)

(52) U.S. Cl.
CPC ........ *G06F 3/04897* (2013.01); *G06F 3/0416* (2013.01); *G06F 3/0488* (2013.01); *G06F 3/04847* (2013.01)

(58) Field of Classification Search
CPC ....... G09F 2203/0339; G09F 2203/041; G09F 2203/048; G09F 2203/04808;
(Continued)

(56) References Cited

U.S. PATENT DOCUMENTS

| 6,424,338 B1 | 7/2002 | Anderson |
| 2011/0043472 A1* | 2/2011 | Hada ................... G06F 3/04883 345/173 |

(Continued)

FOREIGN PATENT DOCUMENTS

WO 2014025910 A1 2/2014

OTHER PUBLICATIONS

Madhvanath, Sriganesh, et al., GeCCo: Finger Gesture-based Command and Control for Touch Interfaces, HP Laboratories, Dec. 6, 2012.

(Continued)

*Primary Examiner* — Sanghyuk Park
(74) *Attorney, Agent, or Firm* — Olive Law Group, PLLC (57) ABSTRACT

A method and apparatus for giving a prompt about a touch input operation is disclosed. A method comprises: displaying a graphic user interface (GUI), wherein a touch input operation prompt corresponding to at least one GUI widget is displayed on the GUI; receiving a touch input operation, wherein the received touch input operation is one of the touch input operations that are prompted on the GUI; executing a command represented by the GUI widget corresponding to the received touch input operation. The method and apparatus may give prompts about touch input operations corresponding to GUI widgets when running a GUI, so that users may execute commands represented by those GUI widgets intuitively using touch input operations.

18 Claims, 5 Drawing Sheets

(51) Int. Cl.
*G06F 3/041* (2006.01)
*G06F 3/0488* (2013.01)
*G06F 3/0484* (2013.01)

(58) Field of Classification Search
CPC .. G09F 2203/048012; G06F 3/34; G06F 3/38; G06F 2206/1008; G06F 1/0643
See application file for complete search history.

(56) References Cited

U.S. PATENT DOCUMENTS

| | | | |
|---|---|---|---|
| 2011/0141050 A1* | 6/2011 | Miura | G06F 3/04883 345/173 |
| 2012/0119985 A1* | 5/2012 | Kang | G06F 3/017 345/156 |
| 2013/0241847 A1 | 9/2013 | Shaffer et al. | |
| 2013/0249806 A1 | 9/2013 | Crisan | |
| 2014/0009441 A1 | 1/2014 | Bernstein et al. | |

OTHER PUBLICATIONS

Choi, Sangwon, et al., Area Gestures for a Laptop Computer Enabled by a Hover-Tracking Touchpad, Human Interaction Computer Lab, KAIST, APCHI '12, Aug. 28-31, 2012, South Korea.
Pajares, M., et al., Usability Analysis of a Pointing Gesture Interface, IEEE International Conference on Systems, Man and Cybernetics, Computational Intelligence Group, Computer Science Faculty, Basque Country University, San Sebatian, Spain, 2004.

* cited by examiner

PRIOR ART

METHOD AND SYSTEM FOR GIVING PROMPT ABOUT TOUCH INPUT OPERATION

CROSS REFERENCE TO RELATED APPLICATION

This application claims priority to Chinese Patent Application No. 201410367831.2, filed Jul. 30, 2014; the disclosure of which is incorporated herein by reference in its entirety.

TECHNICAL FIELD

The present disclosure relates to GUI (Graphical User Interface), and more specifically, to a method and system for giving prompt about touch input operation.

DESCRIPTION OF THE RELATED ART

Touch panels and/or touch screens are referred to as touch input devices, which have gained wide applications in portable computers and other devices. Input operations on touch input devices may be referred to as touch input operations herein. Touch input operations that can be supported by touch input devices comprise: finger sliding operations on touch input devices, finger clicking at any positions on touch input devices, or even some gesture operations. For example, in many applications, spreading two fingers apart on a touch input device represents a zoom-out operation and pinching two fingers on a touch input device represents a zoom-in operation, etc. Finger sliding and clicking operations on touch input devices may realize the effects of a mouse, and gesture operations on touch input devices may remedy limitation of touch screens of devices on which they are provided, enabling more flexible applications of touch input devices.

Figure 2:
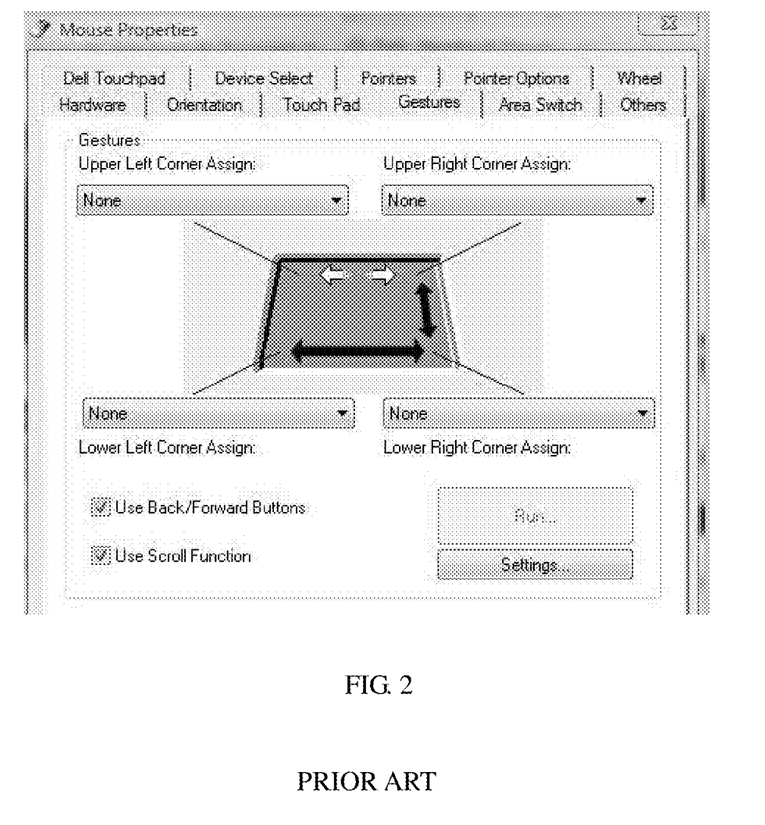
FIG. 2 shows a schematic diagram of mapping specific touch input operations to particular commands by a user in an interface provided in an application.

In applications, operations supported by touch input devices described above are mapped to particular commands (equivalent of menus or keystroke shortcuts). Thus, commands represented by those touch input operations may be directly executed using touch input operations. FIG. 2 shows as the prior art a schematic diagram of mapping touch input operations to particular commands by a user in an interface provided in an application, wherein the user's definitions may comprise: up/down sliding operations on a right area of the touch input device which correspond to window up/down scrolling commands; left/right sliding operations on a top area of the touch input device which correspond to back/forward commands of a browser respectively; double-click operation on the touch input device which correspond to the back command of a browser, etc.

In addition to providing an interface in an application to enable a user to map touch input operations to particular commands as shown in FIG. 2, programmers of applications may map operations on touch input devices to particular commands in their application development. For example, many applications support zoom-in/out operations on touch input devices, for which the touch input operations described above are actually mapped to particular commands by programmers in program development.

However, no matter whether touch input operations are mapped to particular commands by users or programmers, no prompts are provided in display interfaces of applications, causing that users other than those programmers/users do not know what commands may be executed using what touch input operations. In particular, those programmers/ users may forget about correspondences between touch input operations and particular commands set themselves over time, resulting in poor universality of these touch input operations.

SUMMARY

According to one aspect of the present disclosure, there is provided a method for giving a prompt about a touch input operation, comprising: displaying a graphic user interface (GUI), wherein a touch input operation prompt corresponding to at least one GUI widget is displayed on the GUI; receiving a touch input operation, wherein the received touch input operation is one of the touch input operations that are prompted on the GUI; executing a command represented by the GUI widget corresponding to the received touch input operation.

According to another aspect of the present disclosure, there is provided an apparatus for giving a prompt about a touch input operation, comprising: a display device configured to display a graphic user interface (GUI), wherein a touch input operation prompt corresponding to at least one GUI widget is displayed on the GUI; a receiving device configured to receive a touch input operation, wherein the received touch input operation is one of the touch input operations that are prompted on the GUI; an execution device configured to execute a command represented by the GUI widget corresponding to the received touch input operation.

With the method and apparatus provided in this disclosure, prompts about touch input operations corresponding to GUI widgets may be given when displaying a GUI, so as to enable a user to execute commands represented by those GUI widgets intuitively using touch input operations.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the various embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
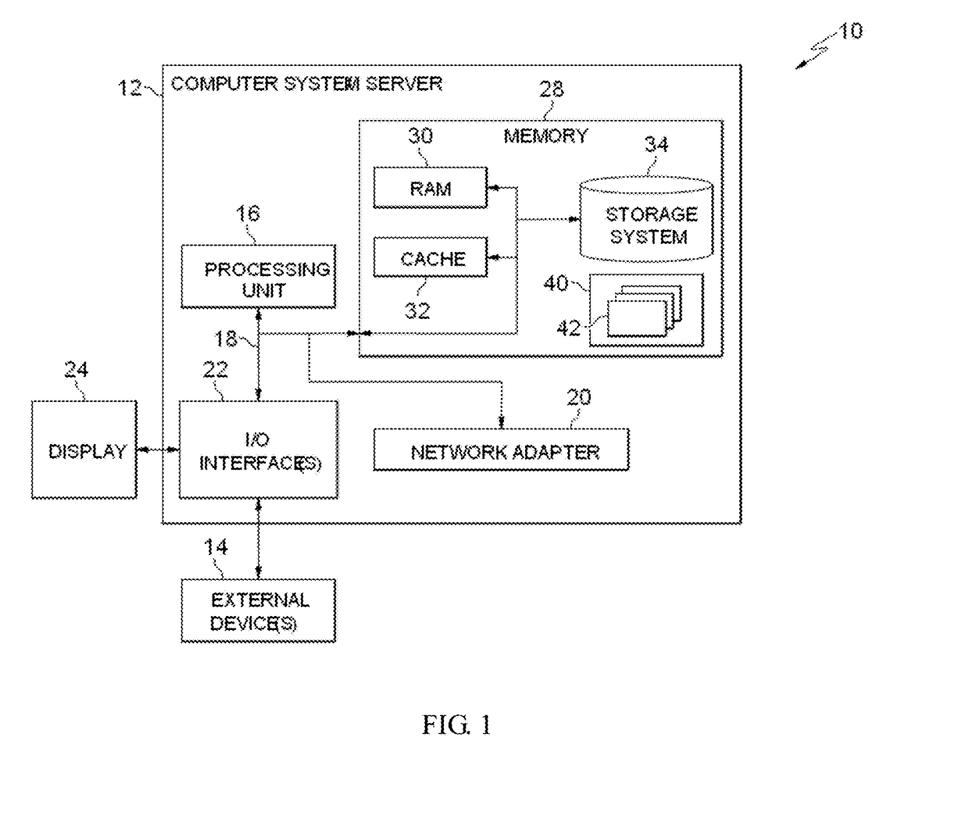
FIG. 1 shows an exemplary computer system/server 12 which is applicable to implement the embodiments of the present disclosure.

Referring now to FIG. 1, in which an exemplary computer system/server 12 which is applicable to implement some embodiments of the present disclosure is shown. Computer system/server 12 is only illustrative and is not intended to suggest any limitation as to the scope of use or functionality of embodiments of the present disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In existing applications, for the convenience of users, specific commands are commonly represented by GUI widgets on a GUI, wherein each GUI widget actually directly representing a particular command. For example, each item on a menu provided on a GUI represents a particular command, such as open file, store file, etc. each button on a GUI represents a command such as "confirm", "cancel", etc. Also, in accordance with the present disclosure, a GUI widget means a widget capable of representing an executable command on a GUI, which may be a predefined widget of the OS (Operating System) or may be a widget that is defined by a user himself/herself, such as a numeric field with +/− or up/down buttons, a calendar date picker, a list box, a drop down list, a vertical or horizontal slider bar, a button, and a component on which click operations are required, such as close, minimization, tile components in a window.

Touch input operations of various embodiments of present disclosure refer to any operation that may be executed on a touch input device by a user, comprising gestures on touch input devices, clicks on touch input devices and slides on touch input devices. Wherein, gestures on touch input devices comprise operations on touch input devices by at least two fingers; clicks on touch input devices comprise single-clicks, or double-clicks on any area of touch input devices using a single finger; slides on touch input devices comprise slide operations on touch input devices with a single finger, such as left rotation slide with a single finger, right rotation slide with a single finger, straight slide to the left with a single finger, straight slide to the right with a single finger, slide in a specific direction in a particular area with a single finger, etc. Those skilled in the art may appreciate that, inspired by the content described above, new touch input operations may be developed and all existing and future finger operations on touch input devices should be considered as touch input operations described herein.

Prompts about touch input operations in various embodiments of the present disclosure may comprise at least one of text prompts, graphic prompts, animation prompts, audio prompts, and video prompts. The text prompt may be a text description nearby a widget or a special character. The graphic prompt may be an icon or a symbol. The animation prompt, audio prompt, video prompt each may be a small prompt nearby the widget. When a mouse is moved over the prompt, an animation, an audio prompt or a video presentation is played. In addition, the text prompt may be combined with the audio prompt; the graphic prompt may be also combined with the audio prompt, and so on. Those skilled in the art may recognize that any type of touch input operation prompt may be used provided that it may give a prompt about the correspondence between a widget and a touch input operation.

Figure 3:
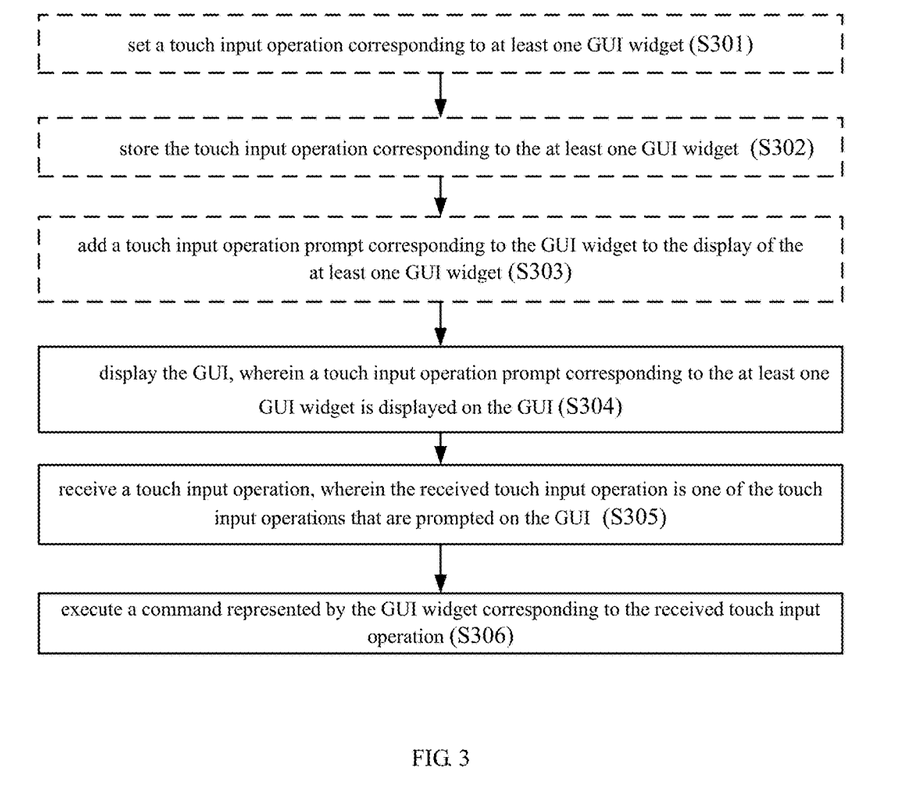
FIG. 3 shows a flowchart of a method for giving a prompt about a touch input operation according to an embodiment of the present disclosure.

Referring now to FIG. 3, a flowchart of a method for giving a prompt about a touch input operation according to an embodiment of the present disclosure is shown. As shown in FIG. 3, at step 304, a GUI is displayed, wherein a touch input operation prompt corresponding to at least one GUI widget is displayed on the GUI. At step 305, a touch input operation is received, wherein the received touch input operation is one of the touch input operations that are prompted on the GUI. Further, at step 306, a command represented by the GUI widget corresponding to the received touch input operation is executed.

Figure 4:
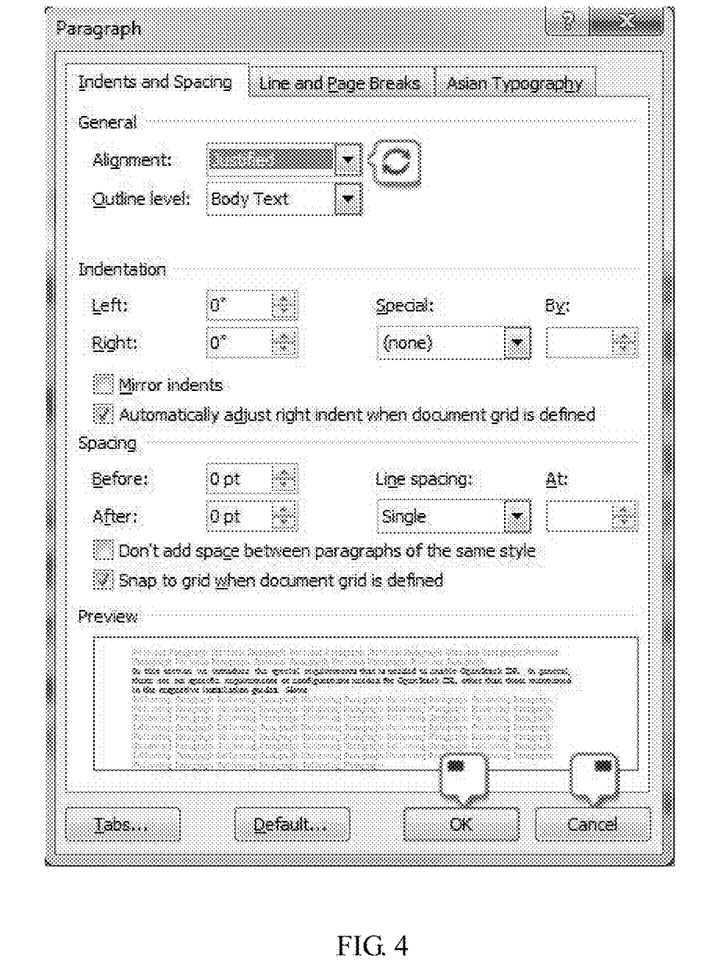
FIG. 4 shows an example of a GUI on which prompts are displayed according to an embodiment of the present disclosure.

FIG. 4 shows an example of a GUI on which prompts are displayed according to an embodiment of present disclosure. A prompt about right rotation touch input operation is given adjacent to a widget "Alignment". Touch input operation prompts of clicking on the left upper area of the touch input device and clicking on the right upper area of the touch input device are respectively given adjacent to buttons "OK" and "Cancel". A touch input operation is received from a user. Provided that the touch input operation is right rotation, a command corresponding to the widget Alignment is executed. Provided that the touch input operation is clicking on the left upper area of the touch input device, a command corresponding to the button "OK" is executed, and so on.

In the prior art, there are implementations of mapping specific touch input operations to particular commands by users or programmers. In these implementations, however, no prompt about touch input operations is displayed on the displayed interface. Therefore, in connection with FIG. 3, before step S304, at step S301, a touch input operation corresponding to at least one GUI widget is set. At step S302, the touch input operation corresponding to the at least one GUI widget such set is stored. At step S303, a touch input operation prompt corresponding to the GUI widget is added to the display of the at least one GUI widget.

Particularly, for an implementation of mapping a specific touch input operation to a particular command by a user, step 301 is a process of setting a corresponding touch input operation to a graphic GUI widget representing a particular command on a GUI by a user, which belongs to the prior art. Step S302 also belongs to the prior art. However, in this implementation, step S303 is a newly added step, which enables the display of the touch input operation prompt corresponding to the at least one GUI widget on the GUI at step S304.

Further, for an implementation of mapping a specific touch input operation to a particular command by a programmer, step 301 is a process of setting a corresponding touch input operation to a graphic GUI widget representing a particular command on a GUI by a programmer during his/her program development, which belongs to the prior art. Step S302 also belongs to the prior art. However, in this implementation, step S303 is a newly added step, which enables the display of the touch input operation prompt corresponding to the at least one GUI widget on the GUI at step S304.

On the other hand, the above implementations can be applied to only applications supporting touch input operations. However, many existing applications do not support touch input operations. If support for touch input operations may be additionally provided for those applications having GUIs displayed in runtime in a manner transparent to programmers as described in the present disclosure, touch input operations may be supported in a user-friendly manner for those existing applications that otherwise do not support touch input operations. The following embodiment directs to this problem. In this embodiment, a third-party application is used to modify the stored content of a present application, while the third-party application runs simultaneously with the application, so as to achieve the above object. Particularly, this method also requires steps S301 to S306. However, in step S301 described above, touch input operations corresponding to at least one GUI widget are set by the third-party application, rather than programmers or users. Particularly, step S301 comprises: at sub-step 1, capturing at least one GUI widget on a GUI to be displayed in a program displaying the GUI; at sub-step 2, selecting one touch input operation from a plurality of touch input operations predefined for each GUI widget of the at least one GUI widget, as a touch input operation corresponding to the GUI widget. That is to say, a plurality of predefined touch input operations are stored in the third-party application. The third-party application first captures at least one GUI widget on a GUI to be displayed in a program displaying the GUI, and then selects a touch input operation for each GUI widget of the at least one GUI widget from the predefined touch input operations, as a touch input operation corresponding to the GUI widget. Thus, in connection to step S303, a touch input operation prompt corresponding to the at least one GUI widget may be displayed at S304. In a further embodiment of the present disclosure, because no touch input operation is supported by GUIs of an application, the method further comprises: at sub-step 3, in response to detecting a touch input device, adding an application supporting touch input operations in the GUI application to enable the application to receive inputted touch input operations.

In the selection process at sub-step 2 described above, in an embodiment, a touch input operation corresponding to a GUI widget may be randomly selected from predefined touch input operations. In another embodiment, a click operation on a touch input device may be selected from a dialog box button, with a corner of the touch input device as its clicking area. For example, clicking operations are selected for "OK", "CANCEL" buttons in FIG. 4 respectively, with the left upper corner and right upper corner of the touch input device as their operation areas. Herein, the ranges of those areas may be predefined. In still another embodiment, sliding operations on the touch input device may be selected from one of the following GUI widgets: a numerical field with +/− or up/down buttons, a calendar date picker, a list box, a drop down list, a vertical or horizontal slider bar, and the like.

Certainly, those skilled in the art may appreciate that users may define selection rules themselves, or different parameters may be defined for a type of touch input operation to obtain different touch input operations. For example, clockwise finger rotation by 5 degrees to select a next item of a drop down list, anticlockwise finger rotation by 5 degrees to select a previous item of the drop down list; clockwise rotation by 10 degrees to select next two items of the drop down list, anticlockwise rotation by 10 degrees to select two previous items of the drop down list, and the like.

Figure 5:
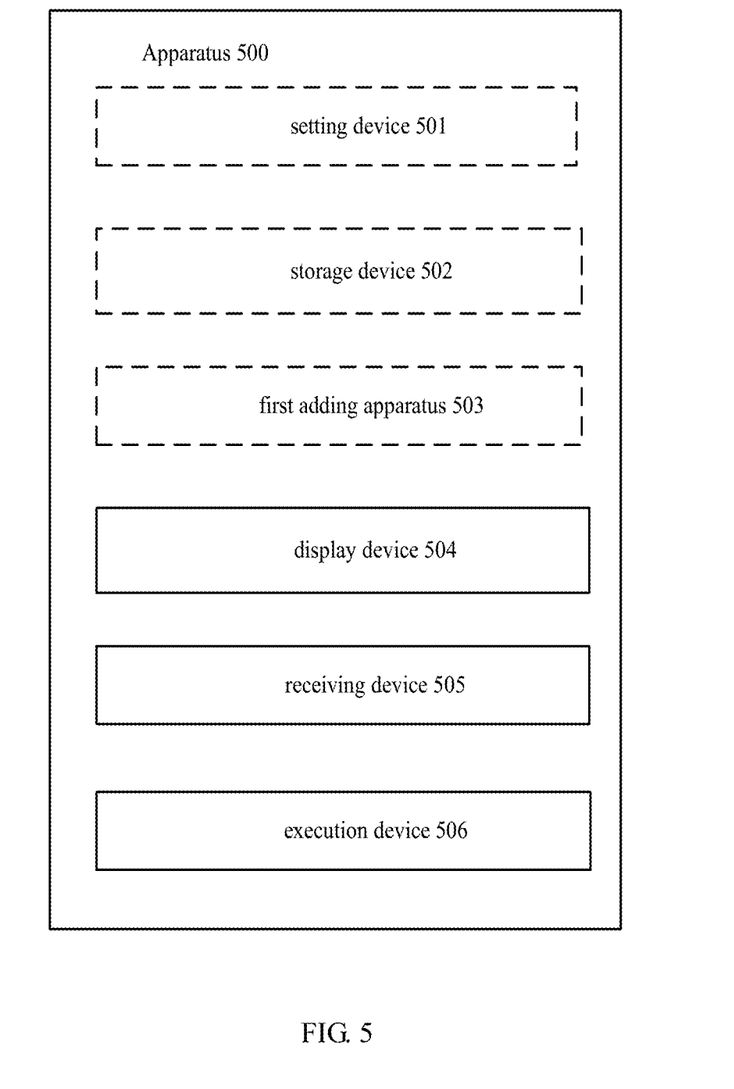
FIG. 5 shows a structural block diagram of an apparatus for giving a prompt about a touch input operation according to an embodiment of the present disclosure.

Under the same concept, an apparatus for giving a prompt about a touch input operation is further disclosed herein. FIG. 5 shows a structure block diagram of an apparatus 500 for giving a prompt about a touch input operation according to an embodiment of the present disclosure. According to FIG. 5, the apparatus 500 comprises: a display device 504 configured to display a graphic user interface (GUI), wherein a touch input operation prompt corresponding to at least one GUI widget is displayed on the GUI; a receiving device 505 configured to receive a touch input operation, wherein the received touch input operation is one of the touch input operations that are prompted on the GUI; and an execution device 506 configured to execute a command represented by the GUI widget corresponding to the received touch input operation.

In an embodiment, the apparatus 500 further comprises: a setting device configured to set the touch input operation corresponding to the at least one GUI widget; a storage device 502 configured to store the touch input operation corresponding to the at least one GUI widget; and a first adding device 503 configured to add a touch input operation prompt corresponding to the GUI widget in a display of the at least one GUI widget.

In an embodiment, the setting device 501 comprises (not shown in FIG. 5): a capturing device configured to capture the at least one GUI widget on a GUI to be displayed by the GUI application; and a selecting device configured to select one touch input operation from a plurality of touch input operations predefined for each GUI widget of the at least one GUI widget, as a touch input operation corresponding to the GUI widget.

In an embodiment, the receiving device 505 comprises (not shown in FIG. 5): a second adding device configured to in response to detecting a touch input device, add an application supporting touch input operations in the GUI application to enable the application to receive inputted touch input operations.

In an embodiment, types of touch input operations comprise at least one of: gestures on the touch input device; clicks on the touch input device; slides on the touch input device.

In an embodiment, touch input operation prompts comprise at least one of: text prompts; graphic prompts; animation prompts; audio prompts; and video prompts.

In an embodiment, GUI widgets comprise at least one of: a numerical field with +/− or up/down buttons, a calendar date picker, a list box, a drop down list, a vertical or horizontal slider bar, a button, a menu, a widget requiring clicking operations.

In an embodiment, the selecting device randomly selects a touch input operation from predefined touch input operations for each GUI widget of the at least one GUI widget.

In an embodiment, in the selecting process of the selecting device, a clicking operation on a corner of the touch input device is selected for a dialog box button among GUI widgets, and a sliding operation on the touch input device is selected for one of the following GUI widgets: a numerical field with +/− or up/down buttons, a calendar date picker, a list box, a drop down list, a vertical or horizontal slider bar.

The present subject matter may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for giving a prompt about a touch input operation, comprising:
   determining whether a graphical user interface (GUI) supports a touch input operation for one or more GUI widgets of the GUI;
   in response to determining the GUI does not support the touch input operation for the one or more GUI widgets, adding a third-party application defining a plurality of predefined touch operations corresponding to the one or more GUI widgets;
   capturing, using the third-party application, the one or more GUI widgets of the GUI to be displayed;
   selecting, using the third-party application, a touch input operation to correspond to a GUI widget of the one or more GUI widgets from amongst the plurality of predefined touch operations;
   displaying the graphic user interface (GUI), wherein a touch input operation prompt corresponding to the selected touch input operation corresponding to the GUI widget is displayed on the GUI;
   receiving a touch input operation, wherein the received touch input operation is the touch input operation that is prompted on the GUI;
   executing a command represented by the GUI widget corresponding to the received touch input operation.

2. The method according to claim 1, further comprising, before displaying the GUI:
   setting the touch input operation corresponding to the at least one GUI widget;
   storing the set touch input operation corresponding to the at least one GUI widget; and
   adding a touch input operation prompt corresponding to the GUI widget in a display of the at least one GUI widget.

3. The method according to claim 2, wherein setting the touch input operation corresponding to the at least one GUI widget comprises:
   capturing the at least one GUI widget on the GUI to be displayed in the GUI application;
   for each GUI widget of the at least one GUI widget, selecting one of the plurality of predefined touch input operations as a touch input operation corresponding to the GUI widget.

4. The method according to claim 3, wherein receiving the touch input operation comprises:
   in response to detecting a touch input device, adding the third-party application supporting the touch input operation in the GUI to enable the GUI to receive inputted touch input operation.

5. The method according to claim 3, wherein the selecting of the plurality of predefined touch input operations is performed as a random selection.

6. The method according to claim 3, wherein during the selecting of the plurality of predefined touch input operations, a clicking operation on a corner of the touch input device is selected for a dialog box button in the GUI widget, and a sliding operation on the touch input device is selected for one of the following GUI widgets: a numerical field with +/− or up/down buttons, a calendar date picker, a list box, a drop down list, or a vertical or horizontal slider bar.

7. The apparatus according to claim 6, wherein the type of the touch input operation comprises at least one of:
   a gesture on the touch input device;
   a click on the touch input device; or
   a slide on the touch input device.

8. The apparatus according to claim 6, wherein the touch input operation prompt comprises at least one of:
   a text prompt;
   a graphic prompt;
   an animation prompt;
   an audio prompt; or
   a video prompt.

9. The apparatus according to claim 6, wherein the GUI widget comprises at least one of: a numerical field with +/− or up/down buttons, a calendar date picker, a list box, a drop down list, a vertical or horizontal slider bar, a button, a menu, or a widget requiring clicking operation.

10. The method according to claim 1, wherein a type of the touch input operation comprises at least one of:

a gesture on the touch input device;
a click on the touch input device; or
a slide on the touch input device.

11. The method according to claim 1, wherein the touch input operation prompt comprises at least one of:
a text prompt;
a graphic prompt;
an animation prompt;
an audio prompt; or
a video prompt.

12. The method according to claim 1, wherein the GUI widget comprises at least one of: a numerical field with +/− or up/down buttons, a calendar date picker, a list box, a drop down list, a vertical or horizontal slider bar, a button, a menu, or a widget requiring clicking operation.

13. An apparatus for giving a prompt about a touch input operation, comprising:
a processing device configured to:
 determine whether a graphical user interface (GUI) supports a touch input operation for one or more GUI widgets of the GUI;
 add a third-party application defining a plurality of predefined touch operations corresponding to the one or more GUI widgets in response to determining the GUI does not support the touch input operation for the one or more GUI widgets;
 capture, using the third-party application, the one or more GUI widgets of the GUI to be displayed;
 select, using the third-party application, a touch input operation to correspond to a GUI widget of the one or more GUI widgets from amongst the plurality of predefined touch operations;
a display device configured to display the graphic user interface (GUI), wherein a touch input operation prompt corresponding to the selected touch input operation corresponding to the GUI widget is displayed on the GUI;
a receiving device configured to receive a touch input operation, wherein the received touch input operation is the touch input operation that is prompted on the GUI;
an execution device configured to execute a command represented by the GUI widget corresponding to the received touch input operation.

14. The apparatus according to claim 13, wherein the apparatus further comprises:
a setting device configured to set the touch input operation corresponding to the at least one GUI widget;
a storage device configured to store the set touch input operation corresponding to the at least one GUI widget; and
a first adding device configured to add a touch input operation prompt corresponding to the GUI widget in a display of the at least one GUI widget.

15. The apparatus according to claim 14, wherein the setting device comprises:
a capturing device configured to capture the at least one GUI widget on the GUI to be displayed in the GUI application; and
a selecting device configured to, for each GUI widget of the at least one GUI widget, select one of the plurality of predefined touch input operations as a touch input operation corresponding to the GUI widget.

16. The apparatus according to claim 15, wherein the receiving device comprises:
a second adding device configured to, in response to detecting a touch input device, add the third-party application supporting the touch input operation in the GUI to enable the GUI to receive inputted touch input operation.

17. The apparatus according to claim 15, wherein the selecting device randomly selects a touch input operation from the predefined touch input operations for each GUI widget of the at least one GUI widget.

18. The apparatus according to claim 15, wherein during the selecting, a clicking operation on a corner of the touch input device is selected for a dialog box button in the GUI widget, and a sliding operation on the touch input device is selected for one of the following GUI widgets: a numerical field with +/− or up/down buttons, a calendar date picker, a list box, a drop down list, or a vertical or horizontal slider bar.

* * * * *